(12) United States Patent
Ji et al.

(10) Patent No.: US 7,400,630 B1
(45) Date of Patent: Jul. 15, 2008

(54) CALL ADMISSION CONTROL WITH OVERBOOKING SUPPORT AND CELL LOSS RATIO AND CELL DELAY VARIATION GUARANTEE

(75) Inventors: Hongbin Ji, San Jose, CA (US); Eraj D. Kaluarachchi, South Orange, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1151 days.

(21) Appl. No.: 09/651,792

(22) Filed: Aug. 30, 2000

(51) Int. Cl.
*H04L 12/28* (2006.01)
*G01R 31/08* (2006.01)

(52) U.S. Cl. .................. 370/395.21; 370/468; 370/400; 370/229

(58) Field of Classification Search ......... 370/229–234, 370/468, 395.21, 400, 235, 395.64, 465, 370/389, 253
See application file for complete search history.

(56) References Cited

U.S. PATENT DOCUMENTS

| | | | |
|---|---|---|---|
| 5,463,620 A * | 10/1995 | Sriram | 370/412 |
| 5,583,857 A * | 12/1996 | Soumiya et al. | 370/233 |
| 5,594,717 A | 1/1997 | Watanabe et al. | |
| 5,696,764 A * | 12/1997 | Soumiya et al. | 370/395.41 |
| 5,850,385 A | 12/1998 | Esaki | |
| 5,862,126 A * | 1/1999 | Shah et al. | 370/395.21 |
| 5,881,049 A | 3/1999 | Beshai et al. | |
| 5,884,174 A | 3/1999 | Nagarajan et al. | |
| 5,894,471 A | 4/1999 | Miyagi et al. | |
| 5,917,804 A * | 6/1999 | Shah et al. | 370/230 |
| 5,982,748 A * | 11/1999 | Yin et al. | 370/232 |
| 5,982,750 A | 11/1999 | Tabe et al. | |
| 6,028,840 A * | 2/2000 | Worster | 370/230 |
| 6,188,690 B1 * | 2/2001 | Holden et al. | 370/390 |
| 6,215,768 B1 * | 4/2001 | Kim | 370/230 |
| 6,324,166 B1 * | 11/2001 | Yokoyama et al. | 370/234 |
| 6,400,685 B1 * | 6/2002 | Park | 370/232 |
| 6,459,681 B1 * | 10/2002 | Oliva | 370/232 |
| 6,477,144 B1 * | 11/2002 | Morris et al. | 370/230.1 |
| 6,490,249 B1 * | 12/2002 | Aboul-Magd et al. | 370/232 |
| 6,608,815 B1 * | 8/2003 | Huang et al. | 370/232 |
| 6,687,228 B1 * | 2/2004 | Fichou et al. | 370/232 |
| 6,735,172 B1 * | 5/2004 | Gibbs et al. | 370/235 |
| 6,865,150 B1 * | 3/2005 | Perkins et al. | 370/230 |
| 2001/0026553 A1 * | 10/2001 | Gallant et al. | 370/395 |

\* cited by examiner

*Primary Examiner*—Hanh Nguyen (57) ABSTRACT

Call admission methods for admitting connections into ATM/IP networks having a plurality of communication channels are disclosed. An overbooking technique is utilized which distinguishes among the different service classes. Each service class is assigned an overbooking factor. The call admission is determined based on the overbooking factor assigned to the class and the effective bandwidth for that service class. In addition, methods are disclosed for performing appropriate bookkeeping, i.e., updating and maintaining information concerning the state of the system.

23 Claims, 8 Drawing Sheets

CALL ADMISSION CONTROL WITH OVERBOOKING SUPPORT AND CELL LOSS RATIO AND CELL DELAY VARIATION GUARANTEE

BACKGROUND OF THE INVENTION

1. Field of the Invention

The present invention relates generally to communication systems, and more particularly to call admission control for controlling access to ATM networks or IP networks with support of differentiates services.

2. Description of the Related Art

An Asynchronous Transfer Mode (ATM) network is one method for realizing a flexible and cost-effective network for handling a wide variety of communications. In an ATM network, various types of data that have various transmission rates and traffic characteristics, are multiplexed. Therefore, the multiplexed traffic load fluctuates heavily and rapidly, especially when high speed calls are multiplexed.

Call admission control (CAC) is an important element of ATM traffic management. CAC provides access by regulating the number and types of connections that can be allowed at any given time for a given amount of resources. In an ATM multi-service network, the resource demand of each connection has to be estimated as a function of several variables, including the cell-level traffic descriptions, the required quality-of-service (QOS), the states of the network resources, and the traffic-stream class of priority. When a call request is made, the ATM network determines whether the quality of service would be suitable in all connections, including connections which are already established when the call request is accepted, and determines propriety of the acceptance according to the available services. To make this determination, it is recommended that each terminal issuing a call request should declare parameters, such as an average rate (an average bandwidth) and a peak rate (a peak bandwidth), as source traffic characteristics, and the call admission control be performed using the declared parameters.

ATM admission control can be based on either of two approaches: a direct performance-evaluation approach or an inverse resource-requirement-estimation approach. In the direct approach, the estimated cell-level performance resulting from the admission of a new connection (or call) is calculated. In the inverse approach, an EBR ("equivalent bit rate," often called the "equivalent bandwidth" or "effective bandwidth") of the new arrival is determined by some artifice or another. The connection is accepted if the remaining unassigned capacity of the route is not less than the calculated EBR. The EBR for a connection which traverses several links may vary from the link to link and would be based on the source's traffic descriptors, the cell-level performance objectives, the speed of the link under consideration, and the buffer size.

Thus, in the inverse approach, call admission criteria can be expressed as follows:

$$BW_{up\text{-}cbr} + BW_{up\text{-}rtvbr} + BW_{up\text{-}nrtvbr} \leq C_p \quad (1A)$$

$$BW_{down\text{-}cbr} + BW_{down\text{-}rtvbr} + BW_{down\text{-}nrtvbr} \leq C_p \quad (1B)$$

where $BW_{up\text{-}crb}$, $BW_{up\text{-}rtvbr}$, and $BW_{up\text{-}nrtvbr}$ are the aggregate effective bandwidth for Constant Bit Rate (CBR), real time Variable Bit Rate (rtVBR) and non-real time Variable Bit Rate (nrtVBR) upstream traffic classes and $BW_{down\text{-}cbr}$, $BW_{down\text{-}rtvbr}$, and $BW_{down\text{-}nrtvbr}$ are the aggregate effective bandwidth for CRB, rtVBR and nrtVBR downstream traffic classes, respectively, and $C_p$ is the port bandwidth. When a new connection request, which belongs to a particular class, comes in, it is necessary to recompute the effective bandwidth for that class and then determine if the above criteria in Equations (1A) and (1B) are met.

There are problems, however, with conventional call admission control. For example, in conventional call admission control systems, there is no perfect call admission control or effective bandwidth computation, as the systems generally make approximation of the traffic models. Accordingly, the systems do not have the capacity for maintaining the communication quality or for efficiently utilizing resources of the network when the systems are supplied with calls which have many different traffic characteristics, making precision traffic control difficult to achieve.

SUMMARY OF THE INVENTION

The present invention provides novel call admission methods for admitting connections in communications networks such as ATM networks or emerging IP networks.

According to the present invention, an innovative overbooking technique is utilized which distinguishes among the different service classes. Each service class is assigned an overbooking factor. The call admission is determined based on the overbooking factor assigned to the class and the effective bandwidth for that service class. In addition, methods are disclosed for performing appropriate bookkeeping, i.e., updating and maintaining information concerning the state of the system.

These and other advantages and features of the invention will become apparent from the following detailed description of the invention which is provided in connection with the accompanying drawings.

DETAILED DESCRIPTION

The present invention will be described as set forth in the embodiments illustrated in FIGS. 1-6. Other embodiments may be utilized and structural, logical or programming changes may be made without departing from the spirit or scope of the present invention.

In accordance with the present invention, an innovative overbooking technique is utilized which distinguishes among the different service classes. Each service class is assigned an overbooking factor. The call admission is determined based on the overbooking factor assigned to the class and the effective bandwidth for that service class.

Figure 1:
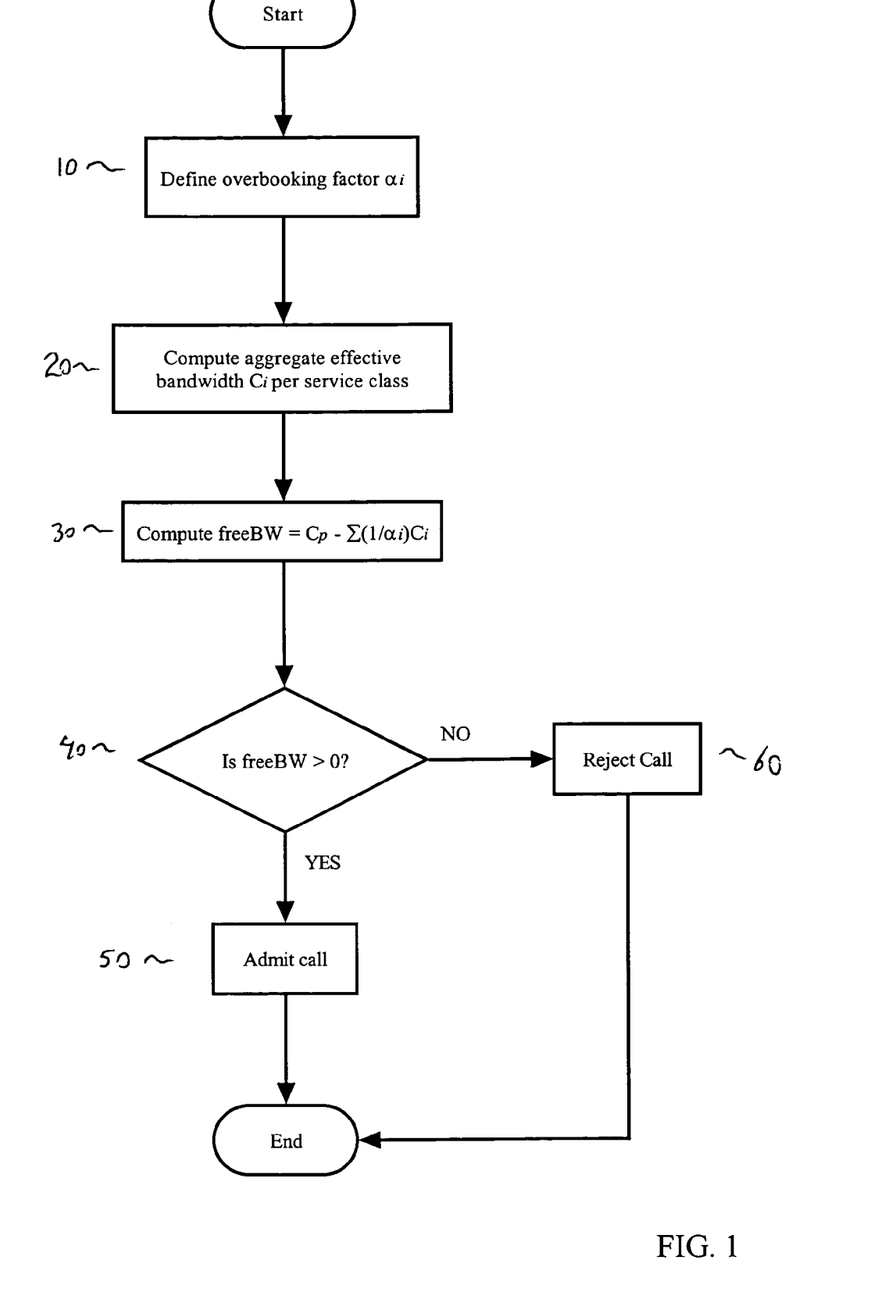
FIG. 1 illustrates in flow chart from a call admission control method that utilizes overbooking per service calls in accordance with the present invention

FIG. 1 illustrates in flow chart form a call admission control method that utilizes overbooking per service class in accordance with the present invention. In step 10, an overbooking factor $\alpha_i$, where i is the index to the class of service, is assigned to each class of service. The default value $\alpha_i=1$ indicates that there is no overbooking for class i. By using different overbooking factors for the different classes, the present invention distinguishes between these classes so as to maximize the bandwidth utilization of the system without sacrificing the QoS guarantee. For example, service classes typically provided with bursty traffic can be overbooked more than service classes that are typically provided with smooth traffic. The exact value that will be assigned for each class will depend on how conservative the system is desired to be. For example, for the CBR class, in which traffic characteristics are quite predictable, the overbooking factor may be close to 1, i.e., very little overbooking. For the VBR class, a value larger than 1 may be assigned to its overbooking factor, i.e., the VBR class may be overbooked more than the CBR class.

In step 20, the aggregate effective bandwidth for class i, designated $C_i$, is calculated. The computation of the effective bandwidth is as follows. For the CBR class, it is known in the art that a buffer size of 150 cells is sufficient to keep cell loss ratio (CLR) below $10^{-11}$ for a very large number of connections (about 5000) at 95% utilization. Therefore, it is reasonable to allocate this amount of buffer for the CBR class without concern for CBR traffic cell loss. Accordingly, only the cell delay variation (CDV) needs to be checked at connection admission time. Let d be the most stringent CDV requirement among CBR traffic. Further let a be the cell transmission time corresponding to the allocated CBR bandwidth. We need to ensure the QoS of CDV is guaranteed by:

$$Pr(q_{cbr} > d/a) < \alpha \quad (2)$$

where $\alpha$ denotes the desired percentile for the CDV, and $q_{cbr}$ is the queue length of the CBR traffic. Heterogeneous CBR traffic multiplexing can be modeled as $\Sigma_i D_i/1/K$ queue. It has been shown that the queue in $\Sigma_i D_i/1/K$ can be upper bounded by the queue of an appropriate approximating N*D/D/1/K queue where the latter queue has the same number of streams as the format but the streams are homogeneous (have the same period) with the common period D such that N/D=p, the same load factor as in the former queue. Given the existing $N_{cbr}$ number of CBR connections with peak cell rate (PCR) being $p_i$ and DCV requirement $d_i$ for i=1, 2, ..., $N_{cbr}$, it is necessary to find the appropriate bandwidth allocation factor $BW_{cbr}$ such that the tighest CDV is met by solving the following equation, which gives the queue distribution in a homogeneous queue with $N_{cbr}$ connections with period D:

$$Pr(q_{cbr} > \alpha) = \sum_{n=\alpha+1}^{N_{cbr}} C_n^{N_{cbr}} \left(\frac{n-\alpha}{D}\right)^n \left(1 - \frac{n-\alpha}{D}\right)^{N_{cbr}-n} \frac{D-N_{cbr}+\alpha}{D-n+\alpha} < \alpha \quad (3)$$

where x=

$$\min_{i=1}^{N_{cbr}} d_i/a, \quad D = N_{cbr} / \frac{\sum_{i=1}^{N_{cbr}} P_i}{BW_{cbr} * ShelfPCR} \quad (4)$$

and where $\alpha$ is the cell transmission time given by cell size divided by $BW_{cbr}*ShelfPCR$, where ShelfPCR is the feeder bandwidth of the multiplexer. Bisection or a table lookup can then be used to solve the above equation and find effective bandwidth allocation $C_i = BW_{cbr}$ for the CBR traffic class.

The rt-VBR traffic class can be characterized by three parameters, $p_i$, $m_i$, $b_i$, which represent peak cell rate (PCR), sustainable cell rate (SRC), burst size for the i-th connection for i=1, 2, ..., $N_{rtvbr}$ where $N_{rtvbr}$ denotes the number of established rt-VBR connections. Assuming the source is modeled by on-off periods, we can compute the average ON and OFF periods by $Ton_i=b_i/p_i$, $Toff_i=b_i/(1/m_i-1/p_i)$. The QoS requirement for rt-VBR is the cell loss ratio (CLR, denoted $L_i$) and the cell delay variation (CDV, denoted by $d_i$), where $\alpha$ denotes the desired percentile for the delay performance.

For loss performance, the following must be satisfied:

$$Pr(q_{rtvbr} > B_{rtvbr}) < L_{min} = \min_{i=1}^{N_{rtvbr}} L_i \quad (5)$$

where $q_{rtvbr}$ and $B_{rtvbr}$ denote the queue occupancy and buffer allocation for rt-VBR traffic class, respectively. For delay performance, the following condition must be checked:

$$Pr\left(q_{rtvbr} > \min_{i=1}^{N_{rtvbr}} d_i * BW_{rtvbr} * ShelfPCR\right) < \alpha \quad (6)$$

Essentially, the cell delay performance checking is similar to cell loss checking. Accordingly, in the following it is only necessary to concentrate on the cell loss performance guarantee, and in Equation (6) the approach can be taken where traffic sources are assumed independent with exponentially distributed on and exponentially distributed off periods. The first stage consists of computing as a function of $B_{rtvbr}$, $L_{min}$, and the traffic description the following lossless effective bandwidth:

$$e_i^o = \frac{P_i}{2}\left[1 - \frac{\sigma_i}{1-\alpha_i} + \sqrt{\left(1 - \frac{\sigma_i}{1-\alpha_i}\right)^2 + 4\sigma_i \frac{\alpha_i}{1-\alpha_i}}\right] \quad (7)$$

where $x_i=m_i/p_i$ and $\sigma_i=B_{rtvbr}/(b_i\log(1/L_{min}))$.

In the second stage, the Gaussian approximation is used to estimate the loss probability which is given in terms of the error function by:

$$Pr(q_{rtvbr} > B_{rtvbr}) \approx erf\left(\frac{BW_{rtvbr} * ShelfPCR - M}{\sqrt{V}}\right) < L_{min} \quad (8)$$

where $$M = \sum_{i=1}^{N_{rtvbr}} m_i, \quad V = \sum_{i=1}^{N_{rtvbr}} m_i(e_i^o - m_i) \quad (9)$$

and $BW_{rtvbr}$ is the effective bandwidth factor required to guarantee the minimum cell loss ratio. Equation (8) can be solved for $C_i = BW_{rtvbr}$ by using a table lookup of inverse error function:

$$BW_{rtvbr} = \min\left(\sum_i e_i^o, M + Q^{-1}(L_{\min})\sqrt{V}\right)/\text{ShelfPCR} \quad (10)$$

where $Q^{-1}$ is the Q-inverse function. The Q-function is defined as:

$$Q(\alpha) = \frac{1}{\sqrt{2\pi}\int_\alpha^\infty e^{-t^2/2}\,dt} \quad (11)$$

where $Q(x) = \alpha$, x can be expressed in terms of the error function as:

$$x = \sqrt{2}\text{erf}^{-1}(1-2\alpha) \quad (12)$$

where $\text{erf}^{-1}$ is the inverse error function.

Once the effective bandwidth $C_i$ per service class is computed in step 20 as described above, it can be determined if a call will be admitted. A call will be admitted if:

$$\sum_i \frac{1}{\alpha_i} C_i \leq C_p \quad (13)$$

where $C_p$ is the total bandwidth of the port, or link, in the system through which the calls are passing. In step 30, the free bandwidth at the port is determined by:

$$\text{freeBW} = C_p - \sum_i \frac{1}{\alpha_i} C_i \quad (14)$$

When a call is requesting to be admitted to the system, in step 40, it is determined if freeBW is greater than zero, i.e., if there is available bandwidth to admit the call. If freeBW is greater than zero, then in step 50 the call is admitted. If in step 40 it is determined that freeBW is less than zero, then in step 60 the call is rejected and entry into the system is denied.

Thus, in accordance with the present invention, an overbooking technique is utilized which distinguishes among the different service classes. Each service class is assigned an overbooking factor, and admission of a call is determined based on the overbooking factor assigned to the class and the effective bandwidth for that service class.

Once it has been determined in step 50 of FIG. 1 that a call can be admitted based on the overbooking, it is necessary to perform bookkeeping on the system to ensure that the system can handle the call if it is admitted. In accordance with the present invention, two types of bookkeeping can be performed: perfect state bookkeeping, and approximate state bookkeeping, as will be further described below.

Figure 2A:
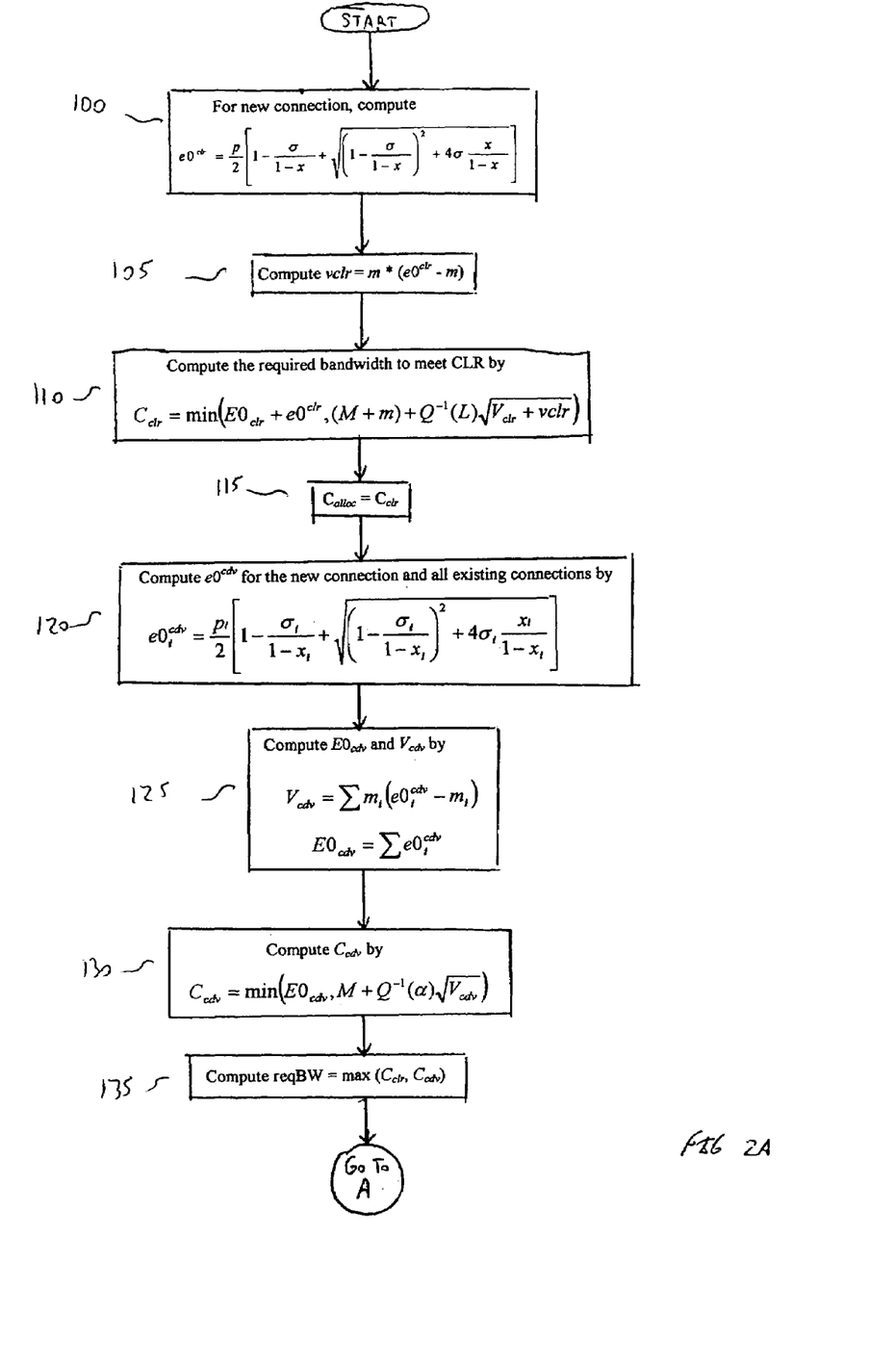
FIGS. 2A and 2B illustrate in flow chart form a perfect state bookkeeping method for meeting both cell loss ratio (CLR) and cell delay variation (CDV) in accordance with the present invention.
Figure 2B:
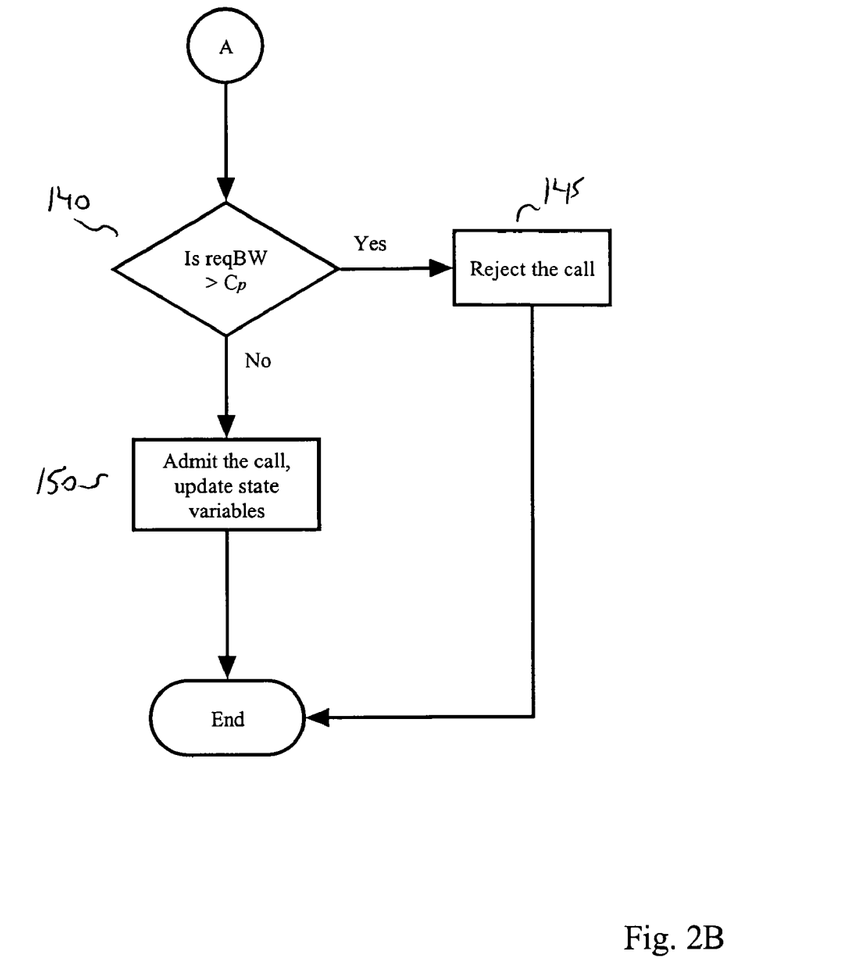

FIGS. 2A and 2B illustrate in flow chart form a method for performing perfect state bookkeeping, in accordance with the present invention, when a connection setup is requested. Suppose for example there are N number of connections each of which is described by the variables $(p_i, m_i, b_i)$, which represent the peak cell rate (PCR), substainable cell rate (SCR) and maximum burst size (MBS) of the i-the connection which shares a buffer of B cells. These state variables are initialized to be zero in the initial phase when there is no connection. The required bandwidth must be determined to meet the following two QoS requirements:

$$\Pr(q > B) < L \quad (15A)$$

$$\Pr(q > d*C_{alloc}) < \alpha \quad (15B)$$

where L is the CLR requirement, d is the CDV requirement, $\alpha$ is the CDV percentile, and $C_{alloc}$ is the allocated bandwidth.

When a new connection setup request, described by p, m, and b, comes in, in step 100 the effective bandwidth to meet the CLR requirement $e0^{clr}$ is computed by $$e0^{clr} = \frac{p}{2}\left[1 - \frac{\sigma}{1-x} + \sqrt{\left(1 - \frac{\sigma}{1-x}\right)^2 + 4\sigma\frac{x}{1-x}}\right] \quad (16)$$

where $x_i = m_i/p_i$ and $\sigma_i = B/(b_i \log(1/L))$. In step 105, the variance of the traffic load for the CLR requirement vclr is computed by $$\text{vclr} = m*(e0^{clr} - m) \quad (17)$$

In step 110, the required bandwidth $C_{clr}$ to meet the CLR requirements is computed by $$C_{clr} = \min(E0_{clr} + e0^{clr}, (M+m) + Q^{-1}(L)\sqrt{V_{clr} + \text{vclr}}) \quad (18)$$

where M, V, and $E0_{clr}$ are the aggregate traffic load, variance of the aggregate traffic load, and sum of the lossless effective bandwidth to meet the CLR requirement, i.e., $$M = \sum m_i \quad (19)$$

$$V_{clr} = \sum m_i(e0_i^{clr} - m_i) \quad (20)$$

$$E0_{clr} = \sum e0_i^{clr} \quad (21)$$

In step 115, $C_{alloc}$ is set equal to the value determined for $C_{clr}$ in step 110. In step 120, effective bandwidth for the new connection as well as all the existing connections to meet the CDV requirements $e0^{cdv}$ is computed by $$e0_i^{cdv} = \frac{p_i}{2}\left[1 - \frac{\sigma_i}{1-x_i} + \sqrt{\left(1 - \frac{\sigma_i}{1-x_i}\right)^2 + 4\sigma_i\frac{x_i}{1-x_i}}\right] \quad (22)$$

where $x_i=m_i/p_i$ and $\sigma_i=d*C_{alloc}/(b_i\log(1/\alpha))$. In step 125, the variance of the aggregate traffic load $V_{cdv}$ and the sum of the lossless effective bandwidth $E0_{cdv}$ to meet the CDV requirements are computed by $$V_{cdv} = \sum m_i(e0_i^{cdv} - m_i) \quad (23)$$

$$E0_{cdv} = \sum e0_i^{cdv} \quad (24)$$

In step 130, the required bandwidth to meet the CDV requirements is computed by $$C_{cdv}=\min(E0_{cdv},M+Q^{-1}(\alpha)\sqrt{V_{cdv}}) \quad (25)$$

In step 135, the required bandwidth reqBW is determined by max $(C_{clr}, C_{cdv})$ and in step 140 the required bandwidth reqBW determined in step 135 is compared to the capacity of the port, or link, $C_p$, in the system through which the calls are passing. If the required bandwidth reqBW is greater than the capacity of the link $C_p$, then in step 145 the call is rejected. If the required bandwidth reqBW is not greater than the capacity of the link $C_p$, then in step 145 the call is accepted and the state variables of the system are updated to include the accepted call as follows:

$N=N+1$ $M+=m$ $V_{clr}+=vclr$ $E0_{clr}+=e0^{clr}$ where N is the number of established connections. Specifically, the number of connections N is increased by one, the aggregate load M is updated by adding the new connection's sustainable cell rate (SCR) m to the previous aggregate load, the aggregate variance of the traffic load $V_{clr}$ is updated by adding the new connection's variance vclr to the previous aggregate variance, and the sum of the lossless effective bandwidth $E0_{clr}$ is updated by adding the new connection's lossless effective bandwidth $e0^{clr}$ to the previous effective bandwidth. Thus, in accordance with the present invention, perfect state bookkeeping is performed when a new connection setup is requested to determine if the call will be admitted or denied.

Figure 3:
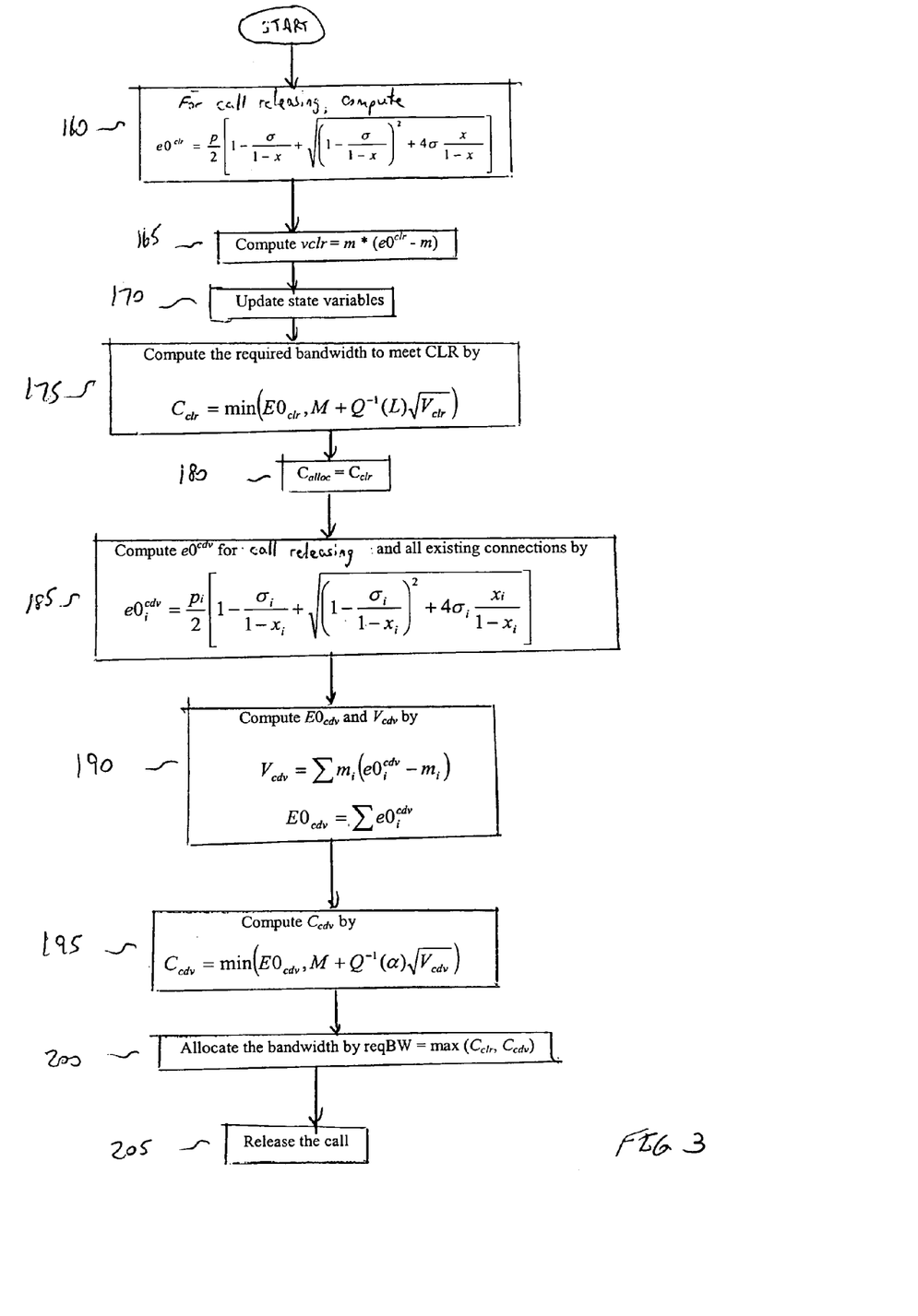
FIG. 3 illustrates in flow chart form a method for performing perfect state bookkeeping, in accordance with the present invention, when a call release is requested.

FIG. 3 illustrates in flow chart form a method for performing perfect state bookkeeping, in accordance with the present invention, when a call release is requested. In step 160 the effective bandwidth to meet the CLR requirement $e0^{clr}$ is computed using Equation (16) for the connection of the call to be released. In step 165, the variance of the traffic load vclr for the call to be released is computed using Equation (17). In step 170, the state variables are updated as follows:

$N=N-1$ $M-=m$ $Vclr-=vclr$ $E0_{clr}-=e0^{clr}$

Specifically, the number of connections N is decreased by one, the aggregate traffic load M is updated by subtracting the sustainable cell rate (SCR) m of the call to be released from the previous aggregate load, the aggregate variance of the traffic load $V_{clr}$ is updated by subtracting the variance vclr of the call to be released from the previous aggregate variance, and the sum of the lossless effective bandwidth $E0_{clr}$ is updated by subtracting the lossless effective bandwidth $e0^{clr}$ of the call to be released from the previous effective bandwidth.

In step 175, the required bandwidth to meet the CLR requirement is computed by $$C_{clr}=\min(E0_{clr},M+Q^{-1}(L)\sqrt{V_{clr}}) \quad (26)$$

In step 180, $C_{alloc}$ is set equal to the value determined for $C_{clr}$ in step 175. In step 185, effective bandwidth $e0^{cdv}$ for the connection of the call to be released as well as all the existing connections to meet the CDV requirement is computed using Equation (22). In step 190, the variance of the aggregate traffic load $V_{cdv}$ and the sum of the lossless effective bandwidth $E0_{cdv}$ to meet the CDV requirement are computed using Equation (23) and (24), respectively. In step 195, the required bandwidth $C_{cdv}$ to meet the CDV requirements is computed using Equation (25). In step 200, the required bandwidth reqBW is allocated, where reqBW=max($C_{clr}$, $C_{cdv}$), and in step 205 the call is released.

Figure 4A:
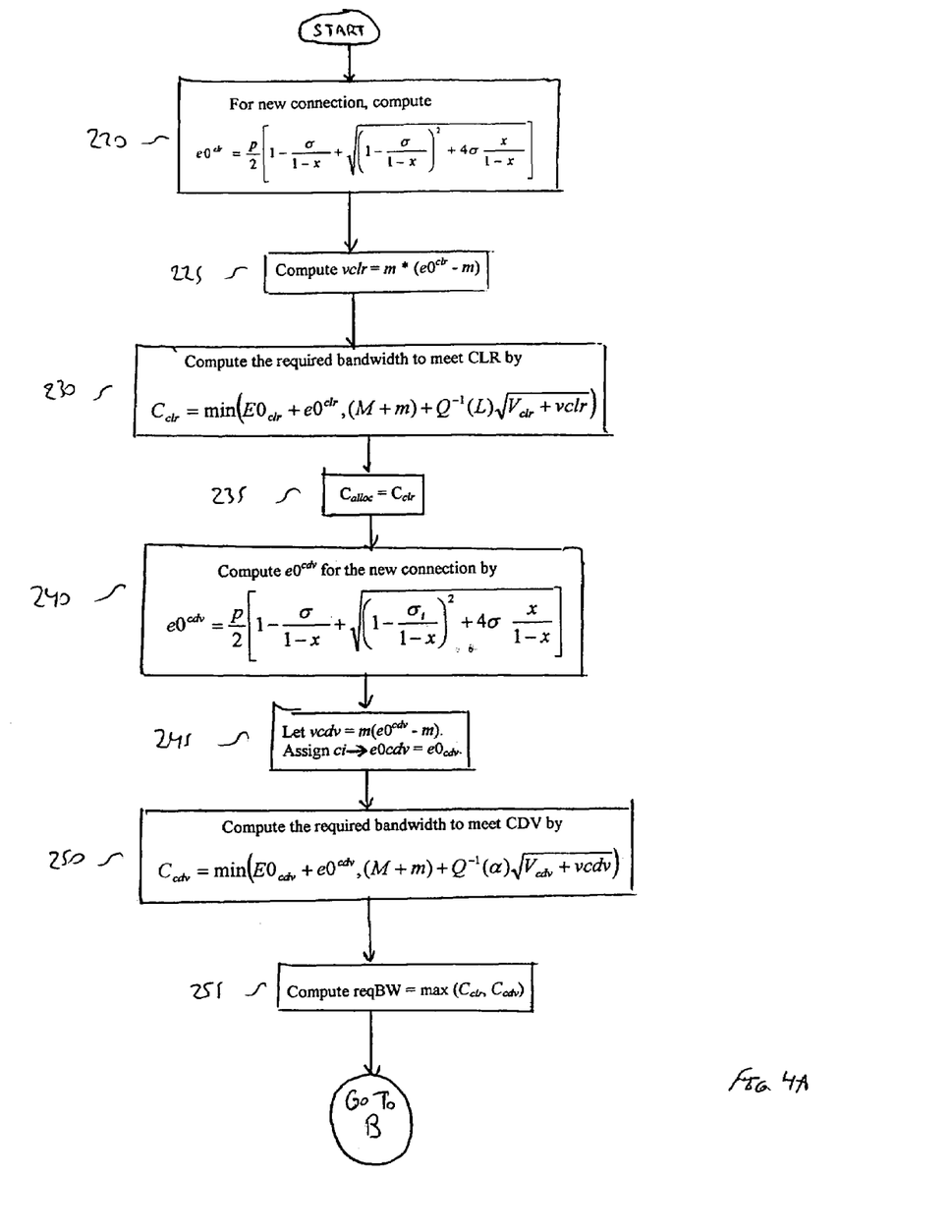
FIGS. 4A and 4B illustrate in flow chart form an approximate state bookkeeping method for meeting both cell loss ratio (CLR) and cell delay variation (CDV) in accordance with the present invention.
Figure 4B:
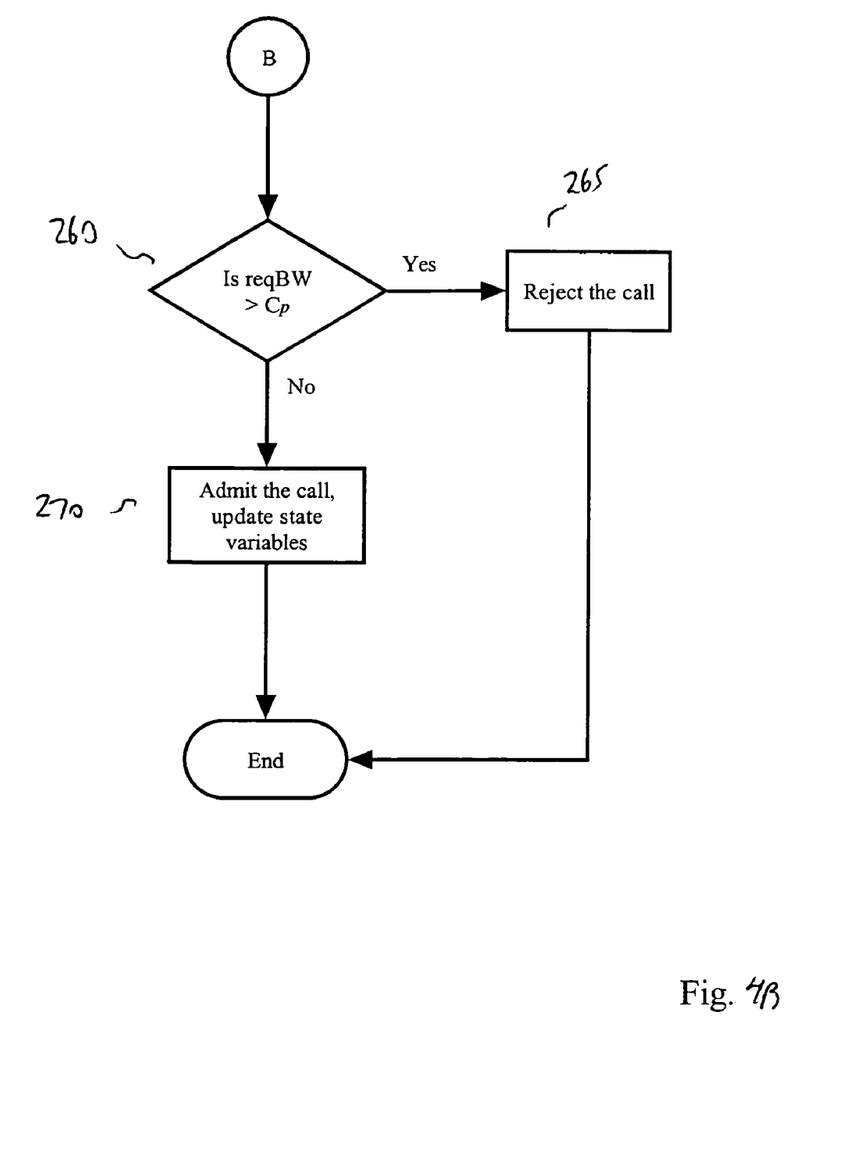

FIGS. 4A and 4B illustrate in flow chart form a method for approximate state bookkeeping, in accordance with the present invention, when a connection setup is requested. The approximate state bookkeeping is similar to the perfect state bookkeeping described in FIGS. 2A and 2B, except that it is not required to re-compute $e0^{cdv}$ for all existing connections when a connection setup is coming.

When a new connection setup $c_i$ request, described by p, m, and b, comes in, in step 220 the effective bandwidth to meet the CLR requirement $e0^{clr}$ is computed using Equation (16). In step 225, the variance of the traffic load vclr is computed using Equation (17). In step 230, the required bandwidth $C_{clr}$ to meet the CLR requirement is computed using Equation (18). In step 235, $C_{alloc}$ is set equal to the value determined for $C_{clr}$ in step 230. In step 240, effective bandwidth $e0^{cdv}$ for the new connection to meet the CDV requirement is computed using Equation (22). In step 245, the variance of the traffic load vcdv is set equal to $m(e0^{cdv}-m)$ and e0cdv is assigned the value of $e0_{cdv}$ computed in step 240 for each connection $c_i$. In step 250, the required bandwidth to meet the CDV requirements is computed by $$C_{cdv}=\min(E0_{cdv}+e0^{cdv},(M+m)+Q^{-1}(\alpha)\sqrt{V_{cdv}+vcdv}) \quad (27)$$

In step 255, the required bandwidth reqBW is determined by max ($C_{clr}$, $C_{cdv}$) and in step 260 the required bandwidth reqBW determined in step 255 is compared to the capacity of the port, or link, $C_p$, in the system through which the calls are passing. If the required bandwidth reqBW is greater than the capacity of the link $C_p$, then in step 265 the call is rejected. If the required bandwidth reqBW is not greater than the capacity of the link $C_p$, then in step 270 the call is accepted and the state variables of the system are updated to include the accepted call as follows:

$N=N+1$ $M+=m$ $Vclr+=vclr$ $E0_{clr}+=e0^{clr}$ $V_{cdv}+=vcdv$ $E0_{cdv}+=e0_{cdv}$ Specifically, the number of connections N is increased by one, the aggregate traffic load M is updated by adding the new connection's sustainable cell rate (SCR) m to the previous aggregate load, the aggregate variance of the traffic load $V_{clr}$ is updated by adding the new connection's variance vclr to the previous aggregate variance, the sum of the lossless effective bandwidth $E0_{clr}$ is updated by adding the new connection's lossless effective bandwidth $e0^{clr}$ to the previous effective bandwidth, the aggregate variance of the traffic load $V_{cdv}$ is updated by adding the new connection's variance vcdv to the previous aggregate variance, and the sum of the lossless effective bandwidth $E0_{cdv}$ is updated by adding the new connection's lossless effective bandwidth $e0^{cdv}$ to the previous effective bandwidth. Thus, in accordance with the present invention, perfect state bookkeeping is performed when a new connection setup is requested to determine if the call will be admitted or denied.

Figure 5:
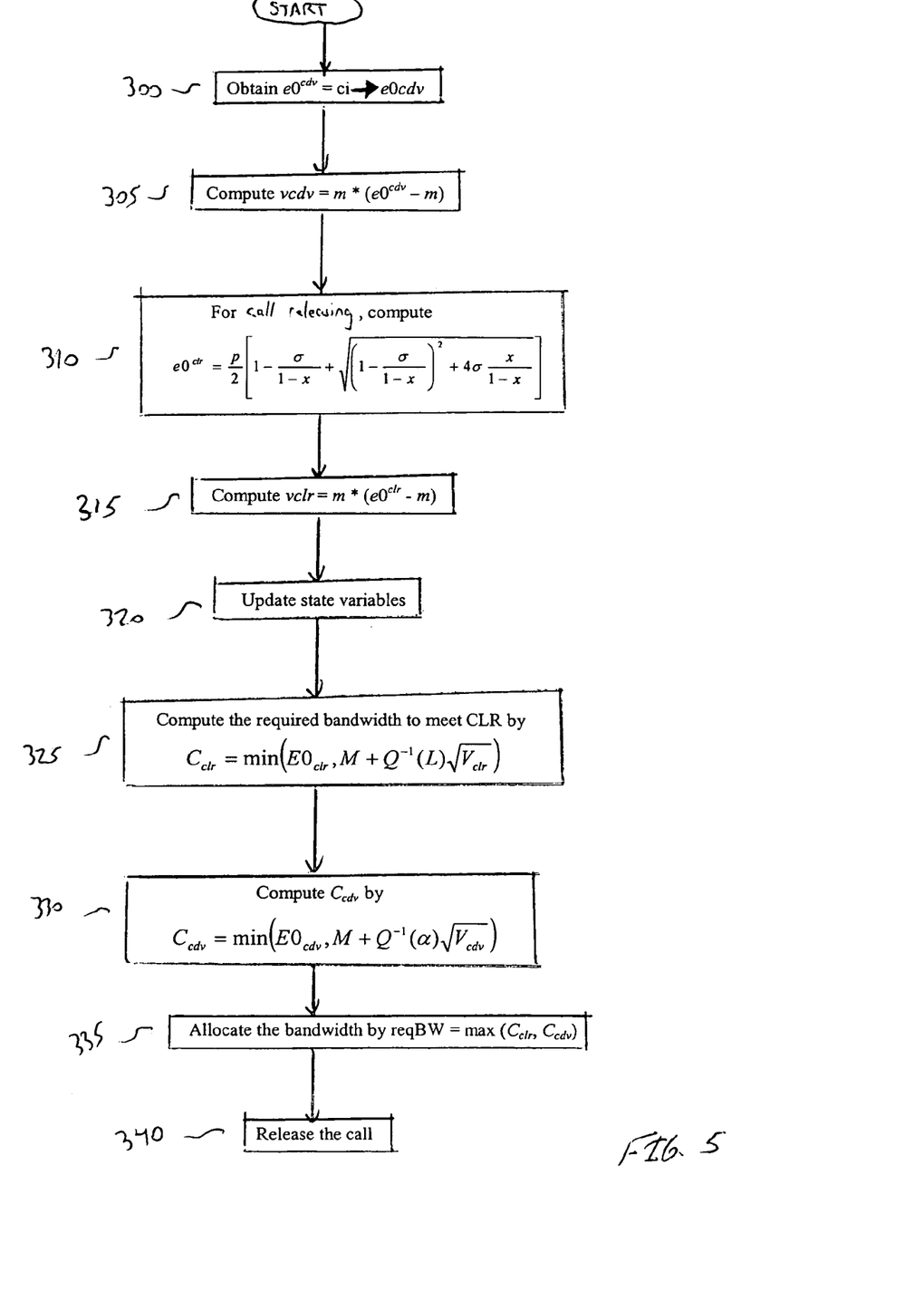
FIG. 5 illustrates in flow chart form a method for performing approximate state bookkeeping, in accordance with the present invention, when a call release is requested.

FIG. 5 illustrates in flow chart form a method for performing approximate state bookkeeping, in accordance with the present invention, when a call release is requested. In step 300, the effective bandwidth to meet the CDV requirement $e0^{cdv}$ is obtained for the call to be released $c_i$, which is the value for e0cdv computed when the call is set up. In step 305, the variance of the traffic load vcdv is calculated using the value for $e0^{cdv}$ obtained in step 300. In step 310 the effective bandwidth to meet the CLR requirement $e0^{clr}$ is computed using Equation (16) for the connection of the call to be released. In step 315, the variance of the traffic load vclr of the call to be released is computed using Equation (17). In step 320, the state variables are updated as follows:

$N = N-1$ $M -= m$ $Vclr -= vclr$ $E0_{clr} -= e0^{clr}$ $V_{cdv} -= vcdv$ $E0_{cdv} -= e0^{cdv}$ Specifically, the number of connections N is decreased by one, the aggregate traffic load M is updated by subtracting the sustainable cell rate (SCR) m of the call to be released from the previous aggregate load, the aggregate variance of the traffic load $V_{clr}$ is updated by subtracting the variance vclr of the call to be released from the previous aggregate variance, the sum of the lossless effective bandwidth $E0_{clr}$ is updated by subtracting the lossless effective bandwidth $e0^{clr}$ of the call to be released from the previous effective bandwidth, the aggregate variance of the traffic load $V_{cdv}$ is updated by subtracting the variance vcdv of the call to be released from the previous aggregate variance, and the sum of the lossless effective bandwidth $E0_{cdv}$ is updated by subtracting the lossless effective bandwidth $e0^{cdv}$ of the call to be released from the previous effective bandwidth.

In step 325, the required bandwidth to meet the CLR requirement is computed using Equation (26). In step 330, the required bandwidth $C_{cdv}$ to meet the CDV requirement is computed using Equation (25). In step 335, the required bandwidth reqBW is allocated, where reqBW=max ($C_{clr}$, $C_{cdv}$), and in step 340 the call is released.

Figure 6A:
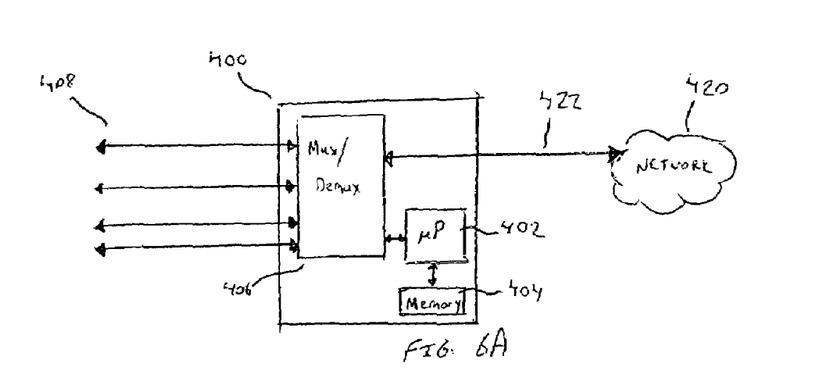
FIG. 6A is a block diagram illustrating an access terminal used in a network in which the methods of the present invention are performed.

The methods of the present invention are implemented in software and, for an ATM or IP network, are to be executed within each access terminal of the network. FIG. 6A illustrates an exemplary access terminal 400 connected to a network 420 by a feeder line 422 and a plurality of distribution lines 408 for customer connections or subscriber ports. The access terminal 400 can be located in a central office or at a remote location. The access terminal 400 includes at least one microprocessor 402; memory circuit 404, and multiplexer/demultiplexer 406. It should be appreciated that an access terminal may contain numerous microprocessors, but only one microprocessor 402 is illustrated. Moreover, the exact architecture of the access terminal 400 is not important as along as it can implement the methods of the present invention as described with respect to FIGS. 1-5. As is known in the art, the micro-processor 402 controls and coordinates the operations of the access terminal including, but not limited to, the call processing and power control functions. The microprocessor 402 and multiplexer/demultiplexer 406 will implement the call admission control methods of the present invention as described with reference to FIGS. 1-5.

Figure 6B:
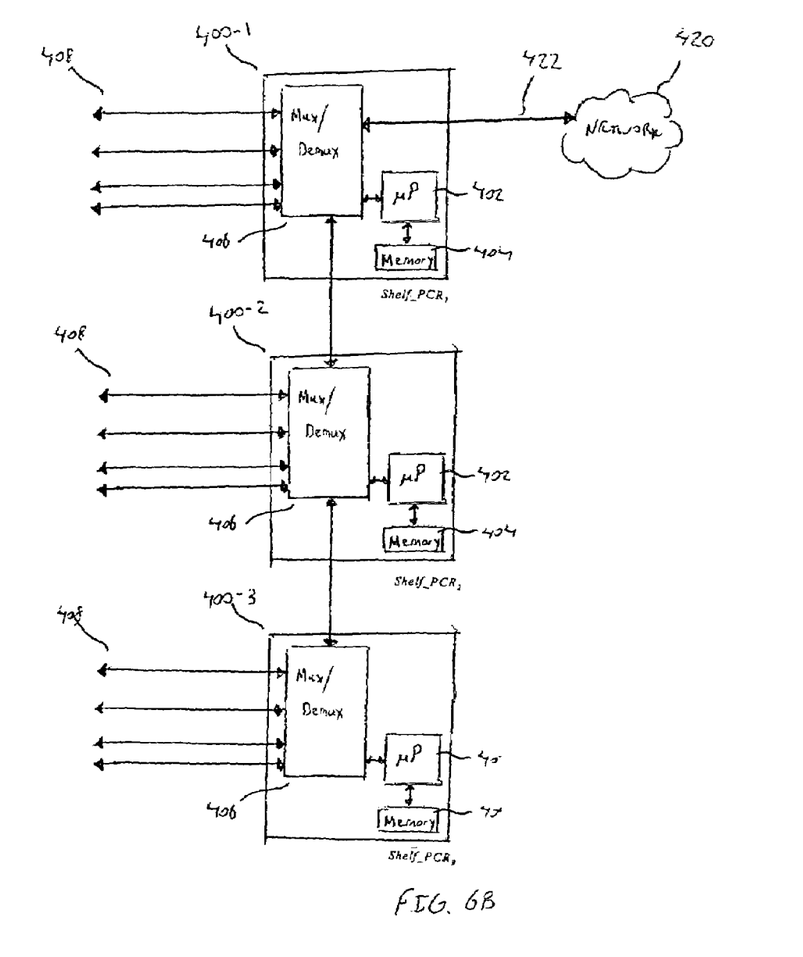
FIG. 6B illustrates in block diagram form a system configuration that includes a daisy chain arrangement of multiple access terminals illustrated in FIG. 6A.

FIG. 6B illustrates in block diagram form a configuration system that includes a daisy chain arrangement of multiple access terminals 400-1, 400-2 and 400-3 as described with respect to FIG. 6A. In this configuration each access terminal 400-1, 400-2 and 400-3, or shelf, is assigned a portion of the bandwidth, i.e., capacity, of the primary feeder 422 connected to network 420, such as for example an ATM network. While three access terminals are illustrated in FIG. 6B, the invention is not so limited and any number of access terminals may be provided. The methods according to the present invention allow each access terminal to have independent bandwidth allocation while ensuring that at provisioning time the summation of the assigned bandwidth to each shelf does not exceed the bandwidth of the primary feeder 422. Thus, each access terminal can function independently of the others in the daisy chain. For example, for a system with a feeder 422 bandwidth of C and a daisy chain having n shelves, the methods according to the present invention ensure the following is complied with:

$$C = shelf\_PCR_1 + shelf\_PCR_2 + shelf\_{PCR3} + \ldots + shelf\_PCR_1 \quad (28)$$

Reference has been made to embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Also, although the invention is described as implemented by a programmable controller, preferably a microprocessor running a software program, it may be implemented in hardware, software, or any combination of the two. All are deemed equivalent with respect to the operation of the invention. Additionally, while the invention has been described with respect to ATM/IP networks, the invention is not so limited and may be used with any type of communication system, including for example wireless communication systems. Accordingly, the invention is not to be considered as limited by the foregoing description, but is only limited by the scope of the appended claims.

What is claimed as new and desired to be protected by Letters Patent of the United States is:

1. A method for controlling call admission to a communication system comprising:
   assigning a unique overbooking factor to each of a plurality of service classes, thereby ensuring no two service classes have an identical overbooking factor;
   determining an effective bandwidth for each class based in part on said assigned overbooking factor and either a cell delay variation for constant bit rate service classes or a cell loss ratio for variable bit rate service classes;

determining a value of a free bandwidth in said communication system based in part on said determined effective bandwidth for each service class; and admitting or rejecting a call based on said determined value for said free bandwidth.

2. The method according to claim 1, wherein said step for determining a free bandwidth further comprises:

determining a maximum bandwidth at a port in the communication system; and subtracting at least a portion of the effective bandwidth for each class from said maximum bandwidth.

3. The method according to claim 2, wherein said step of subtracting further comprises:

dividing the effective bandwidth for each class by its assigned overbooking factor to produce a result; and subtracting said result from said maximum bandwidth.

4. The method according to claim 1, wherein said step of admitting or rejecting further comprises:

admitting said call if said free bandwidth is greater than zero.

5. The method according to claim 4, wherein said step of admitting or rejecting further comprises:

rejecting said call if said free bandwidth is less than zero.

6. The method according to claim 1, wherein said variable bit rate classes include a real time variable bit rate class.

7. The method according to claim 1, wherein said variable bit rate classes include a non-real time variable bit rate class.

8. The method according to claim 1, wherein said assigned overbooking factor has a default value indicating into overbooking.

9. The method according to claim 8, wherein said default value is 1.

10. The method according to claim 1, wherein said communication system is an ATM network.

11. The method according to claim 1, wherein said communication system is an IP network.

12. An access terminal for performing call admission control for a communication system, comprising:

a multiplexer/demultiplexer unit; and a programmed processor, coupled to said multiplexer/demultiplexer unit, operable to:

assign a unique overbooking factor to each of a plurality of service classes, thereby ensuring no two service classes have an identical overbooking factor;

determine an effective bandwidth for each class based in part on said assigned overbooking factor and either a cell delay variation for constant bit rate service classes or a cell loss for variable bit rate service classes;

determine a value of a free bandwidth in said communication system based in part on said determined effective bandwidth for each service class; and admit or reject a call based on said determined value for said free bandwidth.

13. The access terminal according to claim 12, wherein said processor is operable to:

determine a maximum bandwidth at a port in the communication system; and subtract at least a portion of the effective bandwidth for each class from said maximum bandwidth.

14. The access terminal according to claim 13, wherein said processor is operable to:

divide the effective bandwidth for each class by its assigned overbooking factor to produce a result; and subtract said result from said maximum bandwidth.

15. The access terminal according to claim 12, wherein said processor is operable to:

admit said call if said free bandwidth is greater than zero.

16. The access terminal according to claim 15, wherein said processor is operable to:

reject said call if free bandwidth is less than zero.

17. The access terminal according to claim 12 wherein said variable bit rate classes include a real time variable bit rate class.

18. The access terminal according to claim 12 wherein said variable bit rate classes include a non-real time variable bit rate class.

19. The access terminal according to claim 12, wherein said assigned overbooking factor has a default value indicating no overbooking.

20. The access terminal according to claim 19, wherein said default value is 1.

21. The access terminal according to claim 12, wherein said communication system is an ATM network.

22. The access terminal according to claim 12, wherein said communication system is an IP network.

23. The access terminal according to claim 12, wherein said access terminal is daisy chained to at least one other access terminal, each of said access terminals performing said method for controlling call admission independently of the other.

* * * * *